(12) United States Patent
Prus et al.

(10) Patent No.: US 7,774,820 B2
(45) Date of Patent: *Aug. 10, 2010

(54) SETTOP CABLE TELEVISION CONTROL DEVICE AND METHOD INCLUDING BOOTLOADER SOFTWARE AND CODE VERSION TABLE FOR MAINTAINING AND UPDATING SETTOP RECEIVER OPERATING SYSTEM SOFTWARE

(76) Inventors: Bohdand Prus, 3295 Arborwoods Dr., Alpharetta, GA (US) 30022; David B. Lett, 1987 Misty Woods Dr., Duluth, GA (US) 30097

(*) Notice: Subject to any disclaimer, the term of this patent is extended or adjusted under 35 U.S.C. 154(b) by 1105 days.

This patent is subject to a terminal disclaimer.

(21) Appl. No.: 11/046,305

(22) Filed: Jan. 28, 2005

(65) Prior Publication Data
US 2005/0144651 A1    Jun. 30, 2005

Related U.S. Application Data

(63) Continuation of application No. 09/549,292, filed on Apr. 14, 2000, now Pat. No. 7,069,578.

(60) Provisional application No. 60/180,284, filed on Feb. 4, 2000.

(51) Int. Cl.
*H04N 7/173* (2006.01)
*H04N 7/16* (2006.01)
*G06F 9/44* (2006.01)

(52) U.S. Cl. .................. 725/132; 725/140; 725/152; 717/168; 717/171; 717/172; 717/173

(58) Field of Classification Search ............... 725/132, 725/140, 152; 717/168, 171–173; 707/203
See application file for complete search history.

(56) References Cited

U.S. PATENT DOCUMENTS 5,428,789 A * 6/1995 Waldron, III ............. 718/103

(Continued)

FOREIGN PATENT DOCUMENTS

WO    WO 01/058146    8/2001

OTHER PUBLICATIONS

"The PowerTV White Paper", (online) retrived from the Internet Archive (WayBack Machine) using Internet <URL:http://web.archive.org/web/19971212014307/www.powertv.com/1execsum.html>.*

*Primary Examiner*—John W Miller
*Assistant Examiner*—Gigi L Dubasky
(74) *Attorney, Agent, or Firm*—Merchant & Gould

(57) ABSTRACT

A cable television settop receiver and method includes a software component and a frequency acquisition method for determining the ability of the operating system/control program in the settop receiver to operate the settop receiver. The software component, referred to as a "bootloader", executes on the processor contained in the settop receiver and determines the capability and version of the settop receiver operating system/control program. If the bootloader determines that the operating system/control program should be updated, the bootloader initiates a download sequence, the performance of which allows the proper operating system/control program to be downloaded to the settop receiver. The download occurs after receipt, by the settop receiver, of a code version table (CVT). The CVT includes information that the settop receiver uses to determine which frequency to tune to receive the replacement operating system/control program. In accordance with another aspect of the invention, the bootloader initiates a frequency hunt sequence to determine the proper frequency to which to tune to receive the CVT. The frequency hunt sequence covers the entire spectrum of possible frequencies over which to receive the CVT.

30 Claims, 5 Drawing Sheets

U.S. PATENT DOCUMENTS

| | | | |
|---|---|---|---|
| 5,619,250 A * | 4/1997 | McClellan et al. | 725/132 |
| 5,625,693 A * | 4/1997 | Rohatgi et al. | 713/187 |
| 5,666,293 A * | 9/1997 | Metz et al. | 709/220 |
| 5,734,589 A * | 3/1998 | Kostreski et al. | 715/716 |
| 5,951,639 A * | 9/1999 | MacInnis | 725/70 |
| 6,266,810 B1 * | 7/2001 | Tanaka et al. | 717/173 |
| 6,427,238 B1 * | 7/2002 | Goodman et al. | 725/136 |
| 6,757,837 B1 * | 6/2004 | Platt et al. | 714/4 |
| 7,069,578 B1 * | 6/2006 | Prus et al. | 725/132 |

* cited by examiner

SETTOP CABLE TELEVISION CONTROL DEVICE AND METHOD INCLUDING BOOTLOADER SOFTWARE AND CODE VERSION TABLE FOR MAINTAINING AND UPDATING SETTOP RECEIVER OPERATING SYSTEM SOFTWARE

CROSS REFERENCE TO RELATED APPLICATION

This application is a continuation of prior application Ser. No. 09/549,292, filed Apr. 14, 2000, now U.S. Pat. No. 7,069,578, which is entirely incorporated herein by reference and which claims the benefit of U.S. Provisional Application No. 60/180,284, filed on Feb. 4, 2000, and is hereby incorporated herein by reference.

TECHNICAL FIELD

The present invention relates generally to cable television, and, more particularly, to a settop receiver and method including a software component and frequency acquisition method for updating settop receiver operating system software.

BACKGROUND OF THE INVENTION

Cable television systems typically employ a receiver, or settop box, at each customer premises to receive and decode the programming transmitted to the user from a central location (commonly referred to in the industry as the "headend") via the cable infrastructure. The settop box typically includes a receiver, decoder, processing circuitry and operating system software. The settop box is capable of receiving the programming information via the cable and transforming the received signal to a format that can be presented to the viewer via a television set. The operating software contained in conventional settop boxes is typically contained in a memory device and is fixed at the time the settop box is manufactured. This arrangement is sometimes referred to as "firmware" because to change, or upgrade, the operating software requires the removal of the existing memory device and the insertion of a new device containing the new or upgraded software code.

Similarly, problems with the software code that may render the settop box unable to receive and decode the programming signal can be remedied only by replacing the device containing the code, or by requiring a separate communication link between the headend and the settop box for remotely programmable memory elements. If the code resides in firmware, then manual removal and replacement is required. Unfortunately, replacing the software code requires a costly trip to the customer location to perform the change, or requires that the customer return the settop box to a facility to have the repair performed. Similarly, upgrading the operating software code via a separate communication link is costly and inefficient. Using this method, updating settop box groups, or settop boxes from different manufacturers becomes impossible.

Therefore, it would be desirable to have a way to upgrade the settop box operating software without physically removing and replacing the memory device in which the code resides.

SUMMARY OF THE INVENTION

The preferred embodiment of the invention provides a settop receiver and method including a software component and frequency acquisition method for updating settop receiver operating system software.

In architecture, the preferred embodiment of the invention includes a settop cable television control device, comprising a tuner, a receiver connected to the tuner and a processor connected to the receiver. The settop cable television control device also includes a first memory element connected to the processor, a second memory element connected to the processor, a first code portion permanently residing in the first memory element, and a second code portion residing in the first memory element, wherein upon initialization of the control device the processor executes the first code portion independent and prior to execution of the second code portion to:

(a) determine whether the second code portion is capable of operating the control device;

(b) responsive to determining the second code portion is capable of operating the control device, allow the second code portion to operate the control device; and (c) responsive to determining the second code portion is incapable of operating the control device, download a replacement second code portion into the second memory element.

The preferred embodiment of the invention may also be conceptualized as a method for operating a settop cable television control device, the method comprising the steps of: receiving a signal in a tuner, communicating the signal to a receiver connected to the tuner and communicating the signal to a processor connected to the receiver. The method also includes the steps of executing a first code portion, the first code portion residing in a first memory element connected to the processor, wherein the first code portion is executed independent of and prior execution of a second code portion that is stored in the first memory element, determining whether the second code portion is capable of operating the control device, responsive to determining the second code portion is capable of operating the control device, allowing the second code portion to operate the control device, and responsive to determining the second code portion is incapable of operating the control device, downloading a replacement second code portion into a second memory element.

BRIEF DESCRIPTION OF THE DRAWINGS

The preferred embodiment of the invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Figure 1:
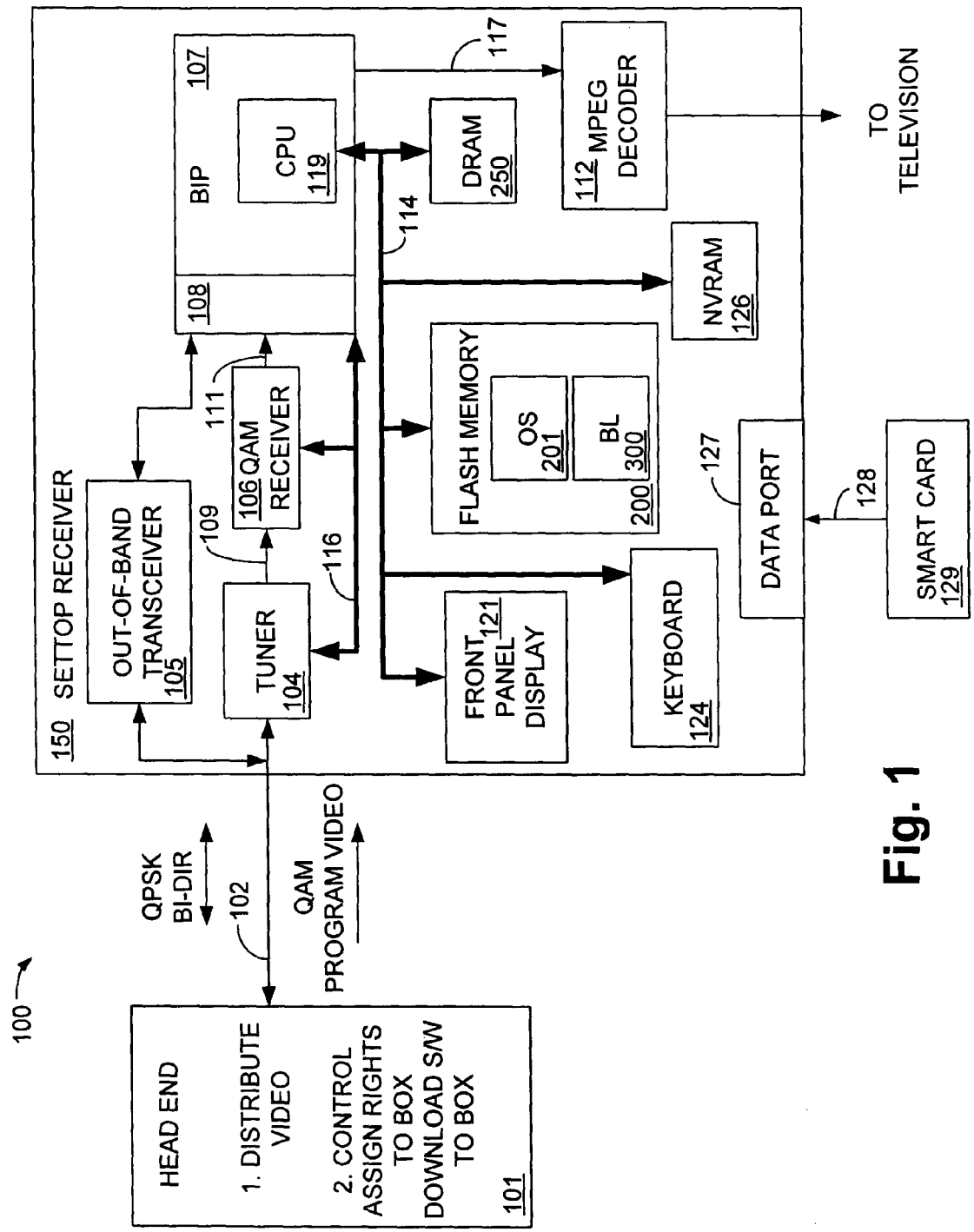
FIG. 1 is block diagram illustrating the cable television system architecture in which the bootloader of the preferred embodiment of the invention resides.

FIG. 1 is block diagram illustrating the architecture of the cable television system 100 in which the software code, hereinafter referred to as "bootloader" code, or "bootloader", of the preferred embodiment of the invention resides. Cable television system 100 includes central distribution point, or head end, 101 connected via connection 102 to settop receiver 150. Head end 101 is responsible for video distribution and provides control functions to settop receiver 150, the control functions including the assigning of rights to the settop receiver 150 and downloading software to the settop receiver 150. Connection 102, while illustrated as a single connection, includes a single direction downstream quadrature amplitude modulation (QAM) channel over which program video data is transmitted from the headend 101 to the settop receiver 150. Connection 102 also includes a bi-directional quadrature phase shift keying (QPSK) communication channel over which control information is exchanged between the headend 101 and the settop receiver 150. In addition, many intermediate devices and types of network transport mediums are also typically included in the connection 102, as would be understood by those reasonable skilled in the art of the present invention. As illustrated by out-of-band (OOB) transceiver 105, the exchange of information using the QPSK channel of connection 102 is independent of the QAM channel to which the settop receiver 150 is tuned.

Settop receiver 150 includes tuner 104, which receives the radio frequency (RF) signal via connection 102 and delivers the RF signal via connection 109 to QAM receiver 106. QAM receiver 106 decodes the QAM signal received over connection 109 and provides, over connection 111, a digital data stream to filter block and (direct memory access) DMA channels 108. Filter block and DMA channels 108 are part of the broadband interactive processor (BIP) 107. The BIP 107 also includes central processing unit (CPU) 119.

The CPU 119 communicates with dynamic random access memory (DRAM) 250, non-volatile random access memory (NVRAM) 126 and with flash memory 200 via communication bus 114. The BIP 107 also communicates via serial control bus 116 to control the operation of tuner 104 and QAM receiver 106. The BIP 107 also communicates, via connection 117, the received digital data stream from QAM receiver 106 to MPEG decoder 112 for transmission to a television set. Except as noted herein, the operation of tuner 104, QAM receiver 106, BIP 107 and CPU 119 are conventional and are known to those skilled in the art of cable television systems.

In accordance with an aspect of the invention, and to be described in detail with respect to FIGS. 2-5, flash memory 200 includes bootloader code 300 in a write protected portion of flash memory 200. The bootloader code 300 typically fits within a 32 kilobyte first sector (sector 0) of flash memory 200.

The settop receiver 150 also includes front panel display 121, which is used to communicate the status of the settop receiver 150 to a user, and includes keyboard 124, which includes buttons (not shown) that allow a user to input various control information to settop receiver 150. The settop receiver 150 also includes a data port 127, which can receive software input from, for example, a portable memory element, commonly known as a smart card 129, via connection 128.

Figure 2:
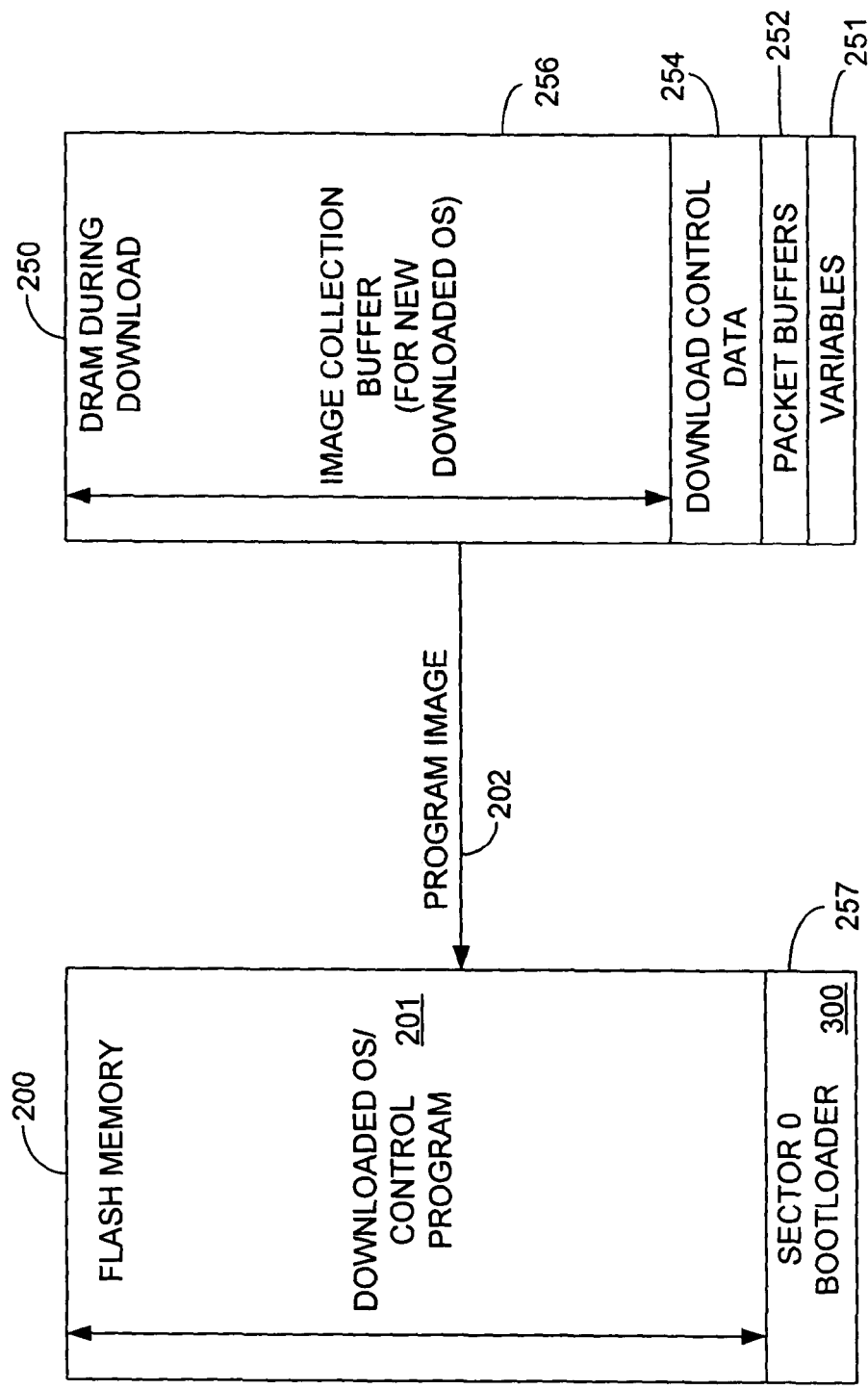
FIG. 2 is a block diagram illustrating the layout of the contents of the flash memory (in which the bootloader of the preferred embodiment of the invention is located) and DRAM of FIG. 1, while the DRAM is used during a download operation.

FIG. 2 is a block diagram illustrating the layout of the contents of the flash memory 200 (in which the bootloader of the preferred embodiment of the invention is located) and DRAM 250 of FIG. 1, while the DRAM 250 is used during a download operation. The DRAM 250 in FIG. 2 is illustrated as it is configured during the download of operating system/control program software from the head end 101 (FIG. 1). DRAM 250 includes a number of different portions. For example, portion 251 includes variables, portion 252 includes packet buffers, portion 254 includes control structures for the downloaded software, and portion 256 is the image collection buffer in which an image (copy) of the downloaded software is temporarily stored before transfer to flash memory 200. The image collection buffer 256 is the portion of DRAM 250 in which downloaded software is temporarily stored. The program image of the downloaded software is then transferred from DRAM 250 via connection 202 to flash memory 200.

Flash memory 200 includes memory portion 201 in which the downloaded operating system/control program is stored, or is written to from DRAM 250, and also includes sector 257 in which the bootloader code 300 of the present invention resides. Sector 257 is preferably the first sector, commonly referred to as "sector 0", in flash memory 200, and is a write protected portion of flash memory 200. In this manner, the bootloader code 300 resident in sector 257 will not be overwritten and will always be present to perform recovery functions when the settop receiver 150 is inoperative. The bootloader resides in firmware that cannot be altered through download.

The bootloader 300 is a set of instructions that is executed directly by the CPU 119 within settop receiver 150 immediately upon reset of the settop receiver 150. The bootloader 300 contains checkup and recovery procedures, thus ensuring basic equipment operation even if the balance of the operating system software is corrupted or missing from the settop receiver 150. System configuration resulting from a system reset places the flash memory 200 at the appropriate physical address so that the bootloader 300 can be accessed by BIP 107 during a reset or a restart. As shown in FIG. 2, and for illustration only, the bootloader 300 resides in memory sector "0" of flash memory 200. The following describes the general functionality of the bootloader, which will be described in greater detail below with respect to FIGS. 3, 4 and 5.

The bootloader 300 checks its own integrity by running a cyclical redundancy check (CRC) on itself and will report any failures via light emitting diodes (LEDs) on front panel display 121 of settop receiver 150 (FIG. 1). The bootloader 300 will also check for the existence of operating system/control program software within portion 201 of flash memory 200 and will start the operating system software if the correct image is verified. The bootloader 300 will also download the operating system/control program from head end 101 via connection 102 (FIG. 1) if it detects a lack of, or a corrupt version of, the operating system/control program software in flash memory 200. This download may be preceded by hunting for the correct download stream on connection 102, and includes collection of image carrying packets and programming of flash memory. The bootloader 300 also processes key press events on keyboard 124 (FIG. 1) during startup and performs auxiliary functions as requested. Such functions include, for example, a forced download even if the operating system/control program checks valid, a technician test mode and the ability to load the diagnostics code and execute it instead of the operating system/control program.

The bootloader 300 can also load (to DRAM 250) a software image through the data port 127 or from an optional smart card device, such as smart card 129 (FIG. 1). The bootloader 300 also provides operating system/control program upgrade service, which includes the automatic processing of deferred requests to upgrade the operating system/ control program software 201. The bootloader 300 will also accommodate emergency reload requests. The bootloader also has a built in function that enables checking of security data on the download image to verify and validate the source.

Figure 3:
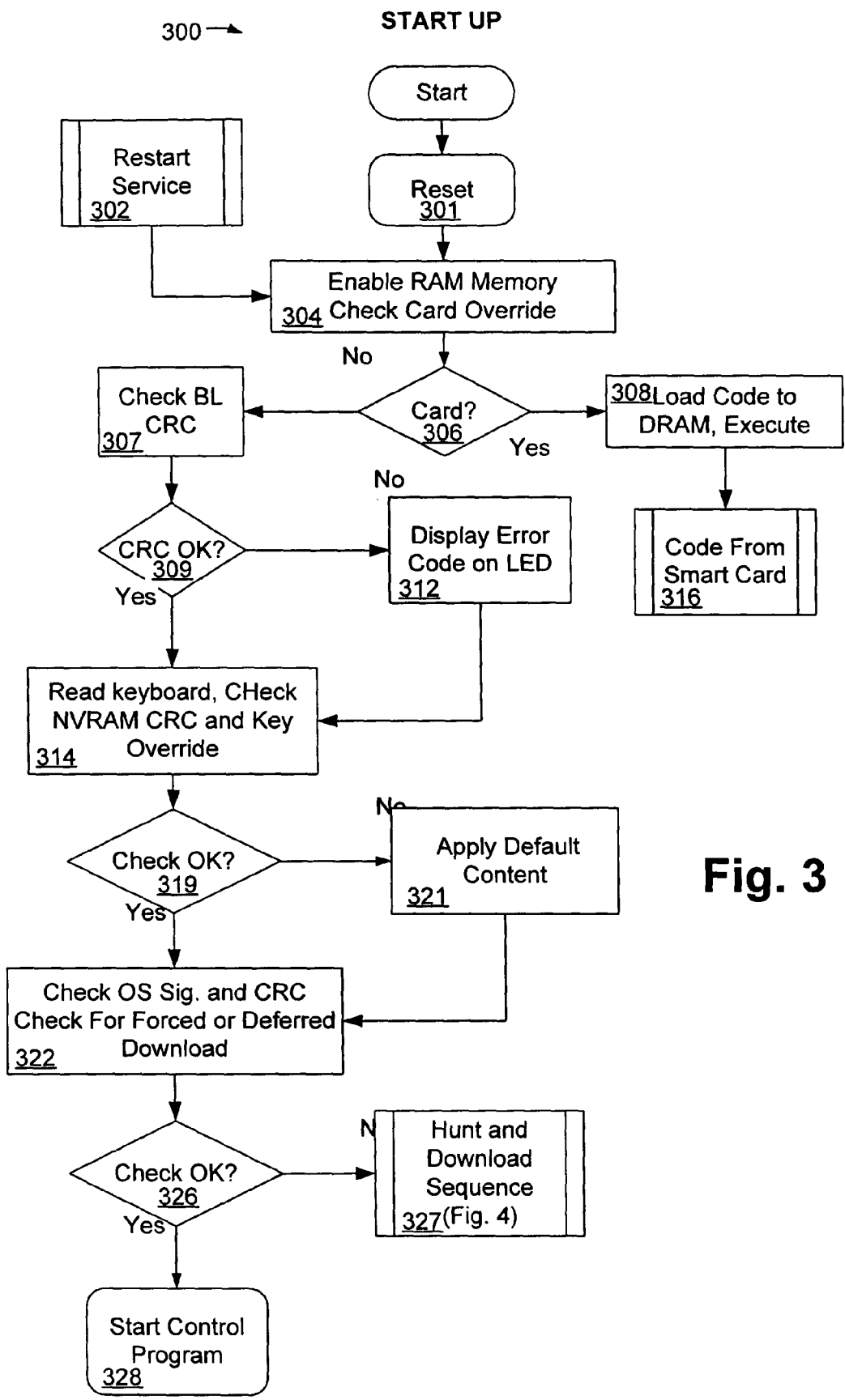
FIG. 3 is a flow chart illustrating the processing during the startup phase of the bootloader of FIG. 2.
Figure 4:
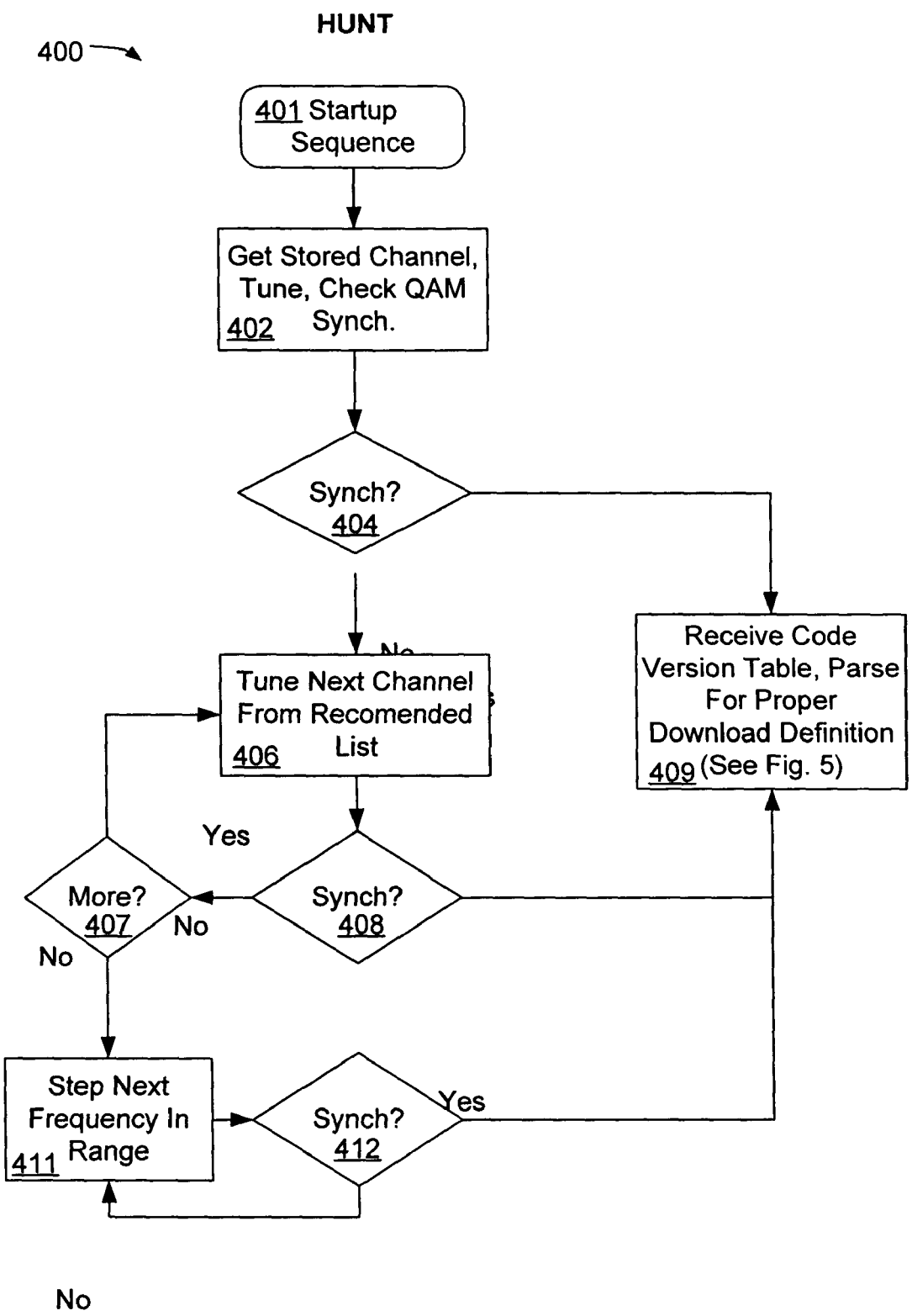
FIG. 4 is a flow chart illustrating the frequency hunt procedure of the bootloader of FIG. 2.
Figure 5:
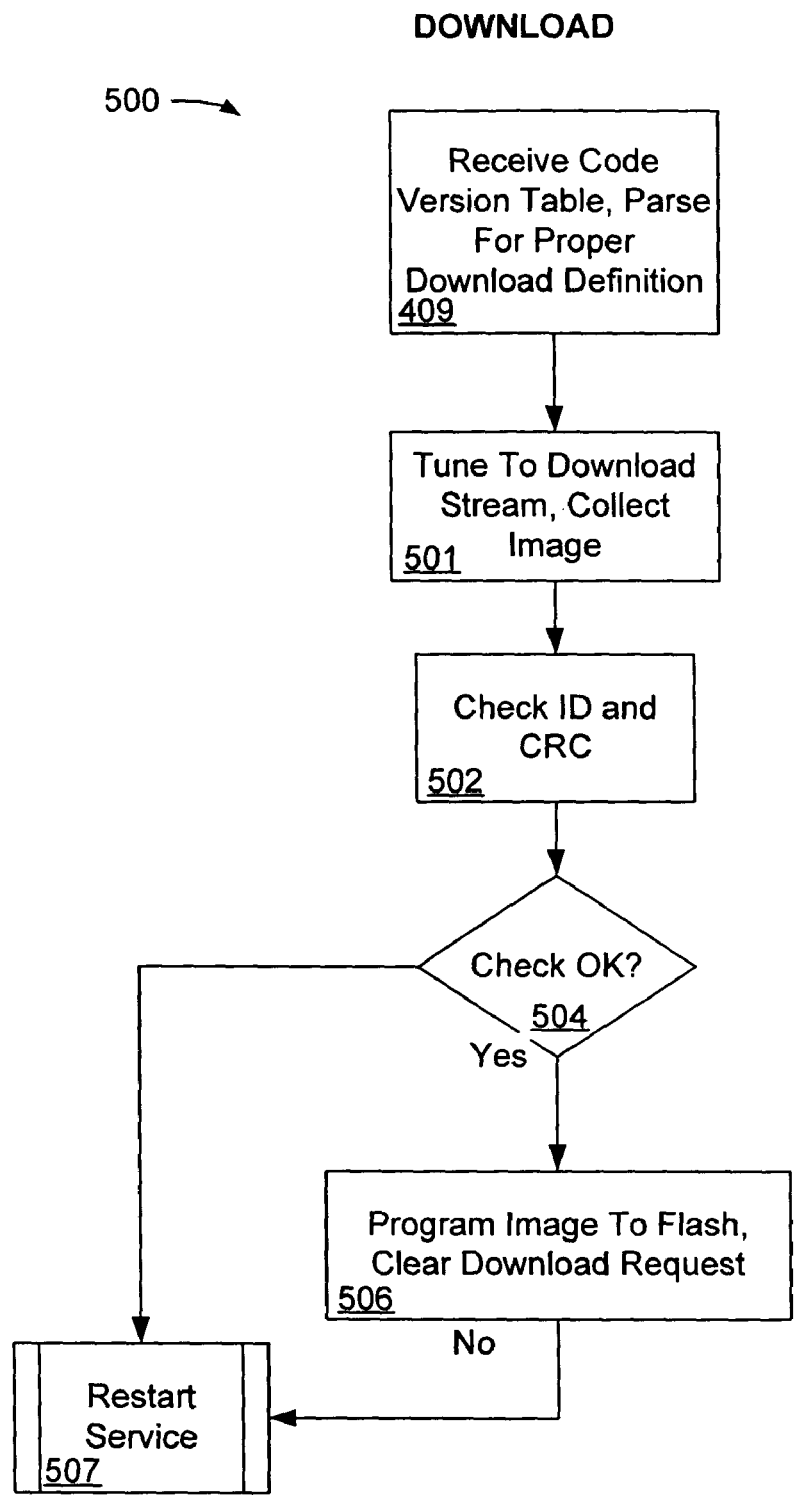
FIG. 5 is a flow chart illustrating the process of obtaining download information and executing the download sequence of the operating system/control program.

FIGS. 3 through 5 are flow charts illustrating various aspects of the operation of the bootloader 300 of FIG. 2. The flow charts of FIGS. 3 through 5 show the architecture, functionality, and operation of a possible implementation of the bootloader software of FIG. 2. In this regard, each block represents a module, segment, or portion of code, which comprises one or more executable instructions for implementing the specified logical function(s). It should also be noted that in some alternative implementations, the functions noted in the blocks might occur out of the order noted in FIGS. 3 through 5. For example, two blocks shown in succession in FIGS. 3 through 5 may in fact be executed substantially concurrently or the blocks may sometimes be executed in the reverse order, depending upon the functionality involved, as will be further clarified hereinbelow.

The bootloader logic of the preferred embodiment of the invention can be implemented in software, hardware, or a combination thereof. In a preferred embodiment(s), the bootloader logic is implemented in software or firmware that is stored in a memory and that is executed by a suitable instruction execution system (microprocessor). If implemented in hardware, as in an alternative embodiment, the bootloader logic can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Furthermore, the bootloader software, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Turning now to FIG. 3, shown is a flow chart illustrating the processing during the startup phase of the bootloader 300 of FIG. 2. In block 301, the settop receiver 150 is reset. This can be accomplished by powering down the settop receiver 150 and activating the settop receiver 150 to begin power up, or can be initiated by pressing a reset button located on keyboard 124 of the settop receiver 150. Once the reset is performed in block 301, then in block 304 the DRAM memory 250 is enabled and the presence of a smart card 129 at data port 127 is determined. A smart card can be any insertable, portable memory device that includes executable code and can be inserted into data port 127 of settop receiver 150.

In block 306 it is determined whether the presence of a smart card was detected in block 304. If there is a smart card present in settop receiver 150 and the smart card responds with the correct override code, then in block 308 the bootloader 300 will load an executable image from the smart card into DRAM 250, and subsequently, into flash memory 200, as described above with respect to FIG. 2. In block 316, the bootloader 300 executes the newly acquired control program software instead of the remainder of the bootloader code. This aspect of the invention provides the method to correct the situation in which there is a serious anomaly, or bug, in the bootloader code.

If it is determined in block 306 that there is no smart card present in settop receiver 150, then in block 307 the bootloader code 300 will perform a cyclical redundancy check (CRC) on itself.

In block 309 it is determined whether the CRC check determines that the bootloader 300 is operable. If the CRC does not check, then in block 312 a failure indicator, which can be an LED on the front panel display 121, of settop receiver 150 (FIG. 1), is illuminated and displays an error code. At this point it is assumed that the bootloader 300 may still be sufficiently operable to run so the startup sequence is continued in block 314 as if it were determined in block 309 that the CRC determined that the bootloader 300 is operable.

Next, in block 314, the bootloader 300 reads the keyboard 124 to determine whether any user initiated functions have been requested. The bootloader 300 also checks the CRC of the NVRAM 126, and checks for any key overrides input through keyboard 124 to settop receiver 150. User initiated functions include auxiliary functions supporting test, maintenance and manufacturing. Key overrides occur when the settop receiver 150 is directed to download new operating system/control program software even if the existing software checks valid.

In block 319 it is determined whether the CRC checks performed in block 314 indicate correct content of the NVRAM portion used by the bootloader 300. If corrupt data is indicated, then in block 321 an error message is displayed on the front panel display 121 of settop receiver 150 and default content is applied. This means that the bootloader 300 will not use any saved data to determine its next action, such as deferred download request, last known download frequency, last CVT version, etc. Next, the process continues at block 322.

If in block 319 it was determined that the CRC check of the NVRAM performed in block 314 indicates correct NVRAM data, then in block 322 the bootloader 300 checks for the existence of operating system/control program 201 (FIG. 2) and will check the integrity thereof. This integrity check is performed by checking for the operating system signature and performing a CRC check on the operating system of the control program software. In block 322 the bootloader 300 also checks for a forced or deferred download (to be described below). If it is determined in block 326 that no bootable image is found in operating system/control program 201, then the bootloader 300 immediately enters the hunt and download sequence of block 327 (to be described below with respect to FIG. 4). With respect to block 326, the signature and CRC for the operating system/control program software is checked using the content of the signature area that is attached to the front of the bootable image.

If in block 326 the operating system control program software 201 checks operable, then in block 328 the control program is started and normal operation of the settop receiver 150 is released to the operating system control program software 201. All of the above checks are performed once during the settop receiver 150 initialization. After handing over control of the settop receiver 150 to the operating system/control program software 201, the bootloader 300 maintains periodic checks of the system operation through what is known as a "watchdog" service. In this manner, the operating system control program 201 periodically queries the bootloader 300 to enable the bootloader watchdog circuitry. This periodic call gives the bootloader 300 a chance to check for emergency messages being sent from the headend 101 on the QAM portion of the connection 102. The watchdog service will be described in further detail below.

FIG. 4 is a flow chart 400 illustrating the frequency hunt procedure of the bootloader 300 of FIG. 2. The image of the operating system/control program 201 is distributed in the in-band data stream on the QAM channels present on connection 102 (FIG. 1). Data is embedded in the private section of the MPEG (motion picture experts group) packets embedded in that data stream. These packets are collected to the DRAM 250 into image collection buffer 256 and, after verification, are transferred to flash memory 200 as described above with respect to FIG. 2 to form the executable image of the operating system/control program software 201. In accordance with an aspect of the invention, the method used to determine the final download frequency for the required executable image is based on reception of a code version table (CVT) that is sent from headend 101 via connection 102 to all settop receivers 150 in special messages on every QAM channel present over connection 102. The CVT is sent on all digital frequencies present on connection 102. The repetition rate of the CVT is preferably once per second. The CVT contains, among other information, the final download frequency to which the tuner 104 in settop receiver 150 will tune so that the settop receiver 150 can receive the operating system/control program download. After receiving the message containing the CVT and tuning to the final download frequency, the settop receiver 150 collects the executable image of the operating system/control program 201 in image collection buffer 256 of DRAM 250 (FIG. 2). The format of the CVT table is illustrated below in Table 1.

TABLE 1

CVT format

Presented below is the format of the Code Version Table. Its hierarchical structure supports flexible grouping of settops for the purpose of the download. There are 3 levels of assignment in the CVT:
1. CVT is divided into OEM (original equipment manufacturer) sub-tables that are identified by 3 bytes of MAC (medium access control) address. In the cable systems with mix of settops from many suppliers this provides the method to download different versions of software depending on the manufacturer.
2. Within each OEM group operator may create logical groups (like the "new software field test group", "better flavor of OS for paying more", "basic software", "Windows CE box" etc.). This is second level of table partitioning.
3. Each CVT record in the set contains hardware ID range for which given version of software is destined.

Placing zeros in ID field disables processing of each of these partitioning levels. This is treated as global ID and means that each settop matches it.
Because CVT is sent to settop both on QAM and QPSK data streams, it has format defined as independent from the transport used.

CVT format is defined as follows:

| | |
|---|---|
| DNCS ID | 2 bytes |
| CVT version | 1 byte |
| # of OEM sub-tables | 1 byte |
| { | |
| OEM sub-table: | |
| MAC range (manufacturer ID) | 3 bytes |
| Number of sets (=nsets) | 1 byte |
| If (nsets>128) | |
| { | |
|   Addressed forced download set: | |
|   Number of sets (=naddr) | 1 byte |
|   for(i==0; i<naddr; i++) | |
|   { | |
|     MAC address lower bytes | 3 bytes |
|   } | |
|   alignment bytes | 0..3 bytes |
| } | |
| for(i==0; i<mod128(nsets); i++) | |
| { | |
|   Group download set: | |
|   group ID | 2 bytes |
|   Number of records (=nrec) | 2 byte |
|   for(k== 0; k<nrec; k++) | |
|   { | |
|     CVT record: | |
|     settop hardware ID - start | 2 bytes |
|     settop hardware ID - end | 2 bytes |
|     frequency vector | 2 bytes |

TABLE 1-continued

```
            carousel Prog#              2 bytes
            image ID                    2 bytes
            download command/# of blocks  2 bytes (3 bits/13 bits)
         }
      }
   }
```
where:

| | |
|---|---|
| DNCS ID | this is 2 byte identifier of the DNCS that controls this segment of network. |
| CVT version | version ID that is incremented every time CVT is updated. Together with DNCS ID forces settop to recheck CVT every time it is changed. |
| | These 3 bytes are saved to NVM non-volatile memory) every time forced download (based on MAC address) is performed. This prevents forced downloads to happen repeatedly on every box restart. |
| # of sub-tables | 1 byte value indicating number of OEM specific subtables in this CVT |
| MAC range | there are 3 OEM specific bytes defining range of MAC address. This field supports specifying different software version for boxes from various manufacturers. If value is set to all zeros, it means global (matches every box). |
| # of sets | number of following group download sets in this OEM sub-table. If this number is higher than 128 (MS-bit of byte is set to 1) then there is set of addresses inserted before first group download set; if not, this number is immediately followed by first download set. Number of actual download sets is always coded on lower 7-bits of this byte. |
| # of addresses | number of 3 byte address groups. These are lower 3 bytes of MAC address, which together with MAC range (above) which provides upper 3 bytes from full MAC address for the box that is to be forced to download. This is one-shot, brute force method to recover particular box. |
| alignment | these are bytes added after the last MAC address group to align forced download set to 32-bit word boundary. Number of bytes varies depending on number of addresses in the set. |
| Group ID | 2 byte for logical grouping of boxes. Group ID 0x0000 is global (forces acceptance with box group ignored) |
| # of records | number of CVT records for this group set (2 bytes - for word alignment reasons) |
| hardware ID | start ID and stop ID (inclusive) identify hardware ID range for which this record should be applied. If stop ID is zero, this forces acceptance regardless of box ID (default). |
| Freq vector | 16-bit value encoding the frequency of the download carousel. Frequency is coded as the number of 0.25 MHz intervals (as an example: for 573.25 MHz vector is 573 * 4 + 1 = 2293). It is assumed that download stream will be broadcasted on the channel positioned on frequency which is multiply of 0.25 MHz (this is current resolution of SA hardware). |
| Carousel Prog | #this is program number of the steam which is containing this software version. Bootloader parses PAT (program allocation table) and PMT (program map table) to find PID (packet ID) for download. |
| image ID | This is 16-bit number identifying the download image in the data stream specified by above PID. It is unique for every code image (fixed in OS signature area). |
| Download command/# of blocks | download command is coded on 3 upper bits of this 16-bit integer. Code 0 (zero) is interpreted as emergency download request. Box starts download immediately, without any consideration for proper shutdown. Remaining 7 codes (1..7) are intended for graceful upgrade - OS is notified that new software exists and should perform appropriate action as assigned to code (user notification, interaction, waiting for OFF etc.). Value of the lower 13 bits encodes the number of blocks in the download image; it is used for efficient buffering on the settop side. |

Packaging
CVT transmitted on the QAM stream is sent in the Private Section blocks following the generic syntax. Values for header fields are as follows:

| | |
|---|---|
| table_id | 0x77 |
| section_syntax_indicator | set to 1 (full format compliance) |
| private_indicator | set to 0 |

TABLE 1-continued

| | |
|---|---|
| private_section_length | as specified in standard (12 bits, value <4093) |
| table_id_extension | set to 0xA753 |
| version_number, section_number, | |
| last_section_number | set to 0, unused |

CVT is transmitted on the pre-assigned PID = 0x1FF8.

Parsing
   Code version table parsing rules:
      CVT table is scanned from the beginning in search of proper section (OEM and logical group match).
      The records in the section are scanned for first match. When hardware ID falls into range of one of the records, this record is selected and parameters from it are used for download.
      As mentioned before, setting one of the selection fields to zero disables parsing based on it. This should be used as the protective stop in the last element of the set and the entire table.
      Zero in the hardware ID range field is used only to create one general group for all the settops which do not fall into any of the specific ranges in preceding CVT records. If there is only one version of software, this could be the only record.
      Zero in group ID defines group which could be either the only one in the system where download groups are not implemented, or protective group in full system. In the latter case, this download set assures recovery of the "lost settops", boxes which have group number corrupted or not assigned yet. Software in this group should provide basic recovery capability (establish QPSK link, get proper parameters).
      Zero in OEM range could be defined in single OEM systems or as general group in systems in which boxes from different OEM use the same software. This will, however, create a problem with addressed forced download. If mentioned functionality is used in the system, CVT must not have this field set to zero.
      If CVT contains forced download address set, settops that match that address will start immediate emergency download even if OS seems to be operable (OS ID in CVT record matches one in box). This functionality allows to addressably "poke", or prod, the settop having the problem and force reloading of the code. It must be implemented in the system as the single-shot operation, to avoid repeated downloads.

Returning now to FIG. 4, in block 401 the startup sequence described above with respect to FIG. 3 has been initiated and the sequence has progressed to block 327 in FIG. 3. In block 402 the bootloader 300 will attempt a number of different techniques to obtain a frequency to which tuner 104 will tune so that the CVT carried on the digital channel can be received. First, the bootloader 300 will attempt to use the last frequency known to include a digital channel. The last frequency known to include a digital channel is typically saved and stored in NVRAM 126 by the operating system/control program 201 before a code download begins. In this manner, the bootloader 300 may easily find the frequency over which the CVT can be received. Next, in block 404, if tuning to the last known good frequency resulted in finding a digital channel, and therefore resulted in the ability to receive the CVT, then in block 409 the CVT is received and processed (see FIG. 5).

In block 404, if tuning to the last known good frequency does not succeed in finding a digital channel over which the CVT can be received, then the bootloader 300, in block 406, will cause the tuner 104 to tune to a number of recommended frequencies stored by settop receiver 150. These frequencies are recommended to cable television operators for the placement of the download channel over which the CVT can be received by the settop receiver 150. Next, in block 408, it is determined whether the tuner 104 has synchronized to a digital channel over which the CVT can be received. If, in block 408, synchronization with a digital channel over which the CVT can be received is not achieved, then in block 407 it is determined whether there are any additional frequencies in the recommended frequency list. If there are additional frequencies in the recommended frequency list, then, in block 406 the bootloader 300 will cause the tuner 104 to tune to the next channel in the recommended list. In block 408 it is again determined whether the next recommended channel is a digital channel to which the settop receiver 150 can synchronize. If yes, then the process proceeds to block 409 for the reception and processing of the CVT (see FIG. 5). If in block 408 synchronization is not obtained, then it is again determined, in block 407, whether there is another channel to tune to in the recommended list. If yes, then the process returns to block 406. If it is determined in block 407 that there are no additional frequencies in the recommended frequency list then in block 411 the bootloader 300 will initiate a full hunt sequence. In accordance with this aspect of the invention, the bootloader 300 will cause tuner 104 to hunt for a QAM channel (on connection 102 of FIG. 1) over which the CVT can be received. In accordance with this aspect of the invention, the entire bandwidth (57 MHz-855 MHz) is scanned in 6 MHz increments to check for the presence of a frequency having a digital channel over which the CVT can be received. After proceeding through the entire spectrum in 6 MHz increments, and if a digital channel is not found, the hunt will be repeated on frequencies shifted by 1 MHz. This will occur up to a total of five times until the frequencies again overlap. Then, the entire sequence is repeated three times with a shift of 250 KHz. In this manner, the entire 57 MHz-855 MHz frequency range will be covered in 24 passes. In this manner, if there is a frequency having a digital channel anywhere in the available spectrum over which the bootloader 300 can receive the CVT, it will be found.

After tuning to each available carrier within the frequency spectrum between and including 57 MHz and 855 MHz, the bootloader 300 will execute a QAM acquisition script for both QAM 64 and QAM 256 channels. The total time for this operation is approximately 250 milliseconds (msec) per channel, which gives a hunt speed of approximately four channels per second. When the QAM channel is detected in any stage of the hunt, the bootloader 300 sets the settop receiver 150 for reception of the CVT. If the CVT is not received within one second, the hunt sequence will continue. If the hunt was started as a result of a checkup failure, the hunt will continue until complete. If a download was requested (either via operating system/control program request or manual override) the hunt will terminate after one full sequence and will then try to start the existing operating system/control program code 201.

Therefore, the operation described above and illustrated in block 411 of FIG. 4 is repeated until it is determined in block 412 that the tuner 104 has synchronized to a frequency having a digital channel over which the CVT can be downloaded and processed, as illustrated in block 409 and to be described with respect to FIG. 5.

FIG. 5 is a flow chart 500 illustrating the process of obtaining download information and executing the download sequence of the operating system/control program 201. Prior to discussing the download sequence, the download initialization process will first be described. The settop receiver 150 will enter the download sequence from the startup procedure (see FIG. 3) when the bootloader 300 detects either an incorrect operating system/control program 201 or is forced into the download sequence by user input to the front panel keyboard 124. An incorrect image of the operating system/control program 201 could be the result of corruption of the flash memory 200, a failed operating system upgrade, or in the case where the settop receiver 150 has never had an operating system/control program 201 loaded. In addition to the above scenarios, manual override is provided to force the download of a new operating system/control program 201. This can be achieved through auxiliary bootloader functionality, controlled from the front panel keyboard 124. The settop receiver 150 may also initiate a download sequence as the result of reception of a system wide emergency download request. This request is received through a dedicated QAM data stream checked periodically by the above-mentioned watchdog service of the bootloader 300.

Download initialization from the operating system/control program 201 is usually performed through a call to the "loader service." Pass parameters give the download channel frequency and command for immediate or deferred download. The bootloader 300 is periodically called by the operating system/control program 201. This is the watchdog mode. The bootloader 300 determines whether there are any CVT packets in memory. If there is CVT information, the bootloader will then determine whether a code download should be performed. If a download is to be performed, the bootloader will return from this call (from the operating system/control program 201), and provide the download code to the operating system/control program 201. A code of a logic "1" indicates that an immediate download is to be performed. In such a case, the bootloader 300 will cause the settop receiver 150 to shut down, and initiate a download. A code of logic "0" indicates that a deferred download is to be performed. In such a case, at an appropriate time so as to cause as little disruption to the subscriber, a deferred download will be initiated.

For an emergency download, the download is started instantaneously without returning control to the caller. In the case of a deferred download, the call does not start any action but only records, in NVRAM 126, the correct download frequency and the deferred download request. The operating system/control program 201 also records the deferred download request and calls the loader service as soon as conditions for an upgrade to the settop receiver 150 operating system/control program software 201 are favorable. This is, when the settop receiver 150 is turned off. The request for download recorded by the bootloader 300 is used only if the settop receiver 150 loses power before getting the immediate request. The startup sequence following this event detects deferred requests and begins the download sequence as will be described in FIG. 5.

Referring again to FIG. 5, in block 409 (see FIG. 4) the CVT is received and parsed for proper download definition. In accordance with an aspect of the invention, the received CVT is parsed according to the rules set forth above in Table 1. In this manner, the information contained in the CVT provides the final channel access vector (i.e. the channel to which tuner 104 should tune to receive the new operating system/control program 201) over which the operating system/control program 201 will be sent to settop receiver 150. In this manner, the settop receiver 150 tunes to this channel and collects the data for the selected image of the operating system/control program 201. This image is placed in image collection buffer 256 (FIG. 2). After the collection is finished, in block 502, the image is checked for the correct identification and CRC. In block 504, if the test fails, the image is discarded and in block 507 the collection is repeated until successful. In block 506, if the image passes the ID and CRC check, it is programmed from the image collection buffer 256 of DRAM 250 into flash memory 200 to reside as the current operating system/control program 201. The operating system/control program 201 is loaded into the first available section of flash memory 200 above sector 0, which is the location of bootloader 300. When the programming is finished, the system is reset in block 507, which once more forces checkup of the new flash content (i.e. the newly downloaded operating system/control program 201) during the main startup sequence (see FIG. 3).

Code images for download will be sent formatted into messages following the standard recommendation for DSMCC (digital storage media command & control) download data block, as shown in Table 2 below.

TABLE 2

Download packet format.
Code images for download will be sent formatted into messages following
standard recommendation for DSM CC Download Data Block.
Format of the received data block is as follows:
DownloadDataBlock( ) {
  DsmccDownloadDataHeader( ) {
    protocolDiscriminator    1
    dsmcc Type    1
    messageID    2

TABLE 2-continued

```
        downloadId              4
        reserved                1
        adaptationLength        1
        messageLength           2
          for(i=0;i<adaptationLength;i++)
              dsmccAdaptationHeader Bytes
          }
    }
    moduleId                    2
    moduleVersion               1
    reserved                    1
    blockNumber                 2
    for(i=0;i<blockSize;i++)
        blockDataBytes
}
```
(compiled from the table 7-1 "DownloadDataHeader" and 7-6 "downloadDataBlock" in DSM-CC specification).
In the above block header following fields are to be defined to hold values as expected:
protocolDiscriminator  0x11   (identifies MPEG-2 DSM-CC message)
dsmccType              0x03   (download message)
messageID              0x1003 (Download Data Block)
downloadID             0x????  -> ignored by download
reserved               0xFF   standard requirement
adaptationLength       0xXX   used to skip adaptation header, word aligned
messageLength          0xLLLL total length in bytes of the rest of message
moduleID               0xYYYY -> image ID from CVT
Data block is encapsulated in the standard Private Section framing, with full syntax header (8 bytes) and CRC32 appended. Following the standard, table ID in header is set to 0x3C.
Download data blocks should be kept as large as possible to minimize burden of formatting overhead on the download efficiency.

Selection of the CVT record for download is performed in the bootloader 300. The operating system/control program 201 receives the CVT record encapsulated in a QPSK message and passes it to the bootloader 300. The bootloader 300 processes the information (CVT), which is kept in sync by a DNCS (digital network control system) located at headend 101. In accordance with another aspect of the invention, the operating system/control program 201 receives the CVT over one of the bi-directional QPSK channels existing on connection 102 as a broadcast message. This message is either broadcast to all settop receivers 150 or individually addressed to individual settop receivers. If done as a broadcast message, the message provides a method for globally upgrading all boxes connected in the network without requiring the hunt sequence of FIG. 4. An individually addressed message will force the addressed settop receiver box 150 to perform an upgrade. The message contains a CVT, which is parsed to determine whether the current version of the operating system/control program should be upgraded. This CVT includes entries that tie specific hardware versions of the settop receiver 150 to the required operating system/control program code version. The entry also contains download channel vectors and control fields used to select forced or delayed download.

The download request message is cycled continuously with the predetermined frequency. Each time the operating system/control program code receives this message it passes it to the bootloader 300, which parses the CVT, as mentioned above, to find the relevant entry. When the relevant entry is found, the version of the operating system/control program from the request is compared to the current version of the operating system/control program. If these two versions are different, the bootloader 300 informs the operating system/control program 201 to perform the necessary action to start an immediate or a delayed download of new operating system/control program code 201 in accordance with that described above. The type of download depends on the control field in the entry. The operating system/control program will initiate the download sequence in the bootloader 300. The bootloader 300 will use the CVT to determine the proper image of the operating system/control program for download. The CVT is received in the dedicated message, repeated frequently on every QAM channel for hunt speed improvement. The bootloader 300 will scan the list for appropriate entry and retrieve the required code ID and download channel vector. These two values are subsequently used for download of the executable image of the operating system/control program.

Bootloader 300 performs parsing of the CVT list according to the following rules. The list is always parsed in linear order. The first match stops parsing. Two components forming the settop receiver 150 hardware/bootloader code 300 configuration and stored in the bootloader 300 are defined to never have a value of zero. If any of these parameters in the received list entry is set to zero, it means that "all the settop receivers 150 with this hardware level" or "all with this boot code version." Finally, if both hardware configuration components are zero it means "all settop receivers." This should be the last list element to cover download to all remaining settop receivers not specified in the list.

The above parsing rules allow for both strict specification of the downloaded software version as well as for download processing for broad classes of settop receivers 150. In this manner, classes or groups of settop receivers 150 can be isolated and independently upgraded with new operating system/control program code.

System Support for Download

The system support required for the download process described above is as follows. The image of the operating system/control program to be downloaded is broadcast on a dedicated data carrousel associated with headend 101. The code is broken into even length packets and framed to form the download stream. The CVT is created and maintained in the DNCS. The CVT contains all versions of the control code for the settop receivers in the system (i.e. the correct operating system/control program images). This table is broadcast continually (once per minute) on the QPSK channel over connection 102 to ensure that all settop receivers in the system have the appropriate operating system/control program version. This broadcast message could also be sent individually to any settop receiver in the system. The CVT is also broadcast on every digital QAM channel in the system at the frequency of approximately once per second. This message is received and recognized only by the bootloader 300 and used for background version check and for the frequency hunt as described above. The emergency download request is inserted as an addressable field in the CVT that is already broadcast every second on the QAM channel and every minute on the QPSK channel.

Auxiliary Functions Processing

The auxiliary functions mentioned above, as part of the startup sequence code, include determining the state of the keys in the front panel keyboard 124. If any of the keys is depressed, the bootloader 300 compares the detected state of the keys against the set of predefined key combinations, which will invoke specific auxiliary functions. Any key combinations that are not recognized and processed within the bootloader 300 are passed to the operating system/control program 201. The auxiliary functions that can be invoked from the keyboard 124 are: manual request to start a code download, request to load through the serial port (NVRAM contents, bootloader module upgrade, executable to flash or RAM), or a request to load from a smart card.

It will be apparent to those skilled in the art that many modifications and variations may be made to the preferred embodiments of the present invention, as set forth above, without departing substantially from the principles of the present invention. For example, the present invention can be used to download operating system/control program code under a variety of conditions. Furthermore, the frequency hunt sequence aspect of the invention is useful in any situation in which it is desirable to find a particular frequency within a spectrum. All such modifications and variations are intended to be included herein within the scope of the present invention, as defined in the claims that follow.

What is claimed is:

1. A method for operating a settop cable television control device, the method comprising the steps of:
   receiving a signal in a tuner;
   communicating the signal to a receiver connected to the tuner;
   communicating the signal to a processor connected to the receiver;
   determining whether a first code portion is operable through a cyclical redundancy check;
   displaying a failure indicator if the first code portion is determined to not be operable;
   executing the first code portion, the first code portion residing in a first memory element connected to the processor, wherein the first code portion is executed independent of and prior to execution of a second code portion that is resident in the first memory element;
   reading a keyboard to determine whether any user initiated functions have been requested;
   determining whether the resident second code portion is error-free and capable of operating the control device regardless of whether the first code portion is found to contain an error;
   responsive to determining the resident second code portion is error-free and capable of operating the control device, allowing the resident second code portion to operate the control device; and
   responsive to determining the resident second code portion contains an error or is incapable of operating the control device, downloading a replacement second code portion into a second memory element.

2. The method of claim 1, further including the steps of:
   responsive to downloading the replacement second code portion, determining whether the replacement second code portion is capable of operating the control device;
   responsive to determining the replacement second code portion is capable of operating the control device, storing the replacement second code portion in the first memory element; and
   responsive to storing the replacement second code portion in the first memory element, allowing the replacement second code portion in the first memory element to operate the control device.

3. The method of claim 1, wherein when the tuner is tuned to a digital frequency, the first code portion continually receives a code version table containing information regarding the frequency to which to tune to receive the replacement to the second code portion.

4. The method of claim 3, wherein the first code portion causes the tuner to tune to a particular frequency and the first code portion causes the replacement second code portion to be downloaded to the control device and replace the resident second code portion.

5. The method of claim 1, wherein when the tuner is tuned to a frequency other than a digital frequency, the first code portion causes the tuner to hunt for a digital frequency over which to receive a code version table containing information regarding the frequency to which to tune to receive the replacement to the resident second code portion.

6. The method of claim 5, wherein the tuner hunts for the digital frequency by analyzing each frequency in an available bandwidth.

7. The method of claim 1, wherein the first code portion runs in a background mode when the resident second code portion is operating the control device.

8. The method of claim 1, further including the step of:
   causing the control device to communicate with a cable television headend over a first communication channel and a second communication channel.

9. The method of claim 8, wherein the second communication channel is a bi-directional communication channel.

10. The method of claim 9, wherein the first code portion runs in a background mode when the resident second code portion is operating the control device and the first code portion receives a code version table over the second communication channel.

11. The method of claim 10, wherein the code version table contains information regarding the frequency to which to tune to receive an updated second code portion.

12. A settop cable television control device, comprising:
   a tuner;
   a receiver connected to the tuner;
   a processor connected to the receiver;
   a first memory element connected to the processor;
   a second memory element connected to the processor;
   a first code portion permanently residing in the first memory element; and
   a second code portion permanently residing in the first memory element, wherein upon initialization of the control device the processor executes the first code portion independent and prior to execution of the resident second code portion to:
determine whether the first code portion is operable through a cyclical redundancy check;
display a failure indicator if the first code portion is determined to not be operable;
read a keyboard to determine whether any user initiated functions have been requested;
(a) determine whether the resident second code portion is error-free and capable of operating the control device regardless of whether the first code portion is found to contain an error;
(b) responsive to determining the resident second code portion is error-free and capable of operating the control device, allow the resident second code portion to operate the control device; and
(c) responsive to determining the resident second code portion contains an error or is incapable of operating the control device, download a replacement second code portion into the second memory element.

13. The control device of claim 12, wherein the processor executes the first code portion independent and prior to execution of the resident second code portion to:
(d) responsive to downloading the replacement second code portion, determine whether the replacement second code portion is capable of operating the control device;
(e) responsive to determining the replacement second code portion is capable of operating the control device, store the replacement second code portion in the first memory element; and
(f) responsive to storing the replacement second code portion in the first memory element, allow the replacement second code portion in the first memory element to operate the control device.

14. The control device of claim 12, wherein when the tuner is tuned to a digital frequency, the first code portion continually receives a code version table containing information regarding the frequency to which to tune to receive the replacement to the second code portion.

15. The control device of claim 14, wherein the first code portion causes the tuner to tune to a particular frequency.

16. The control device of claim 12, wherein when the tuner is tuned to a frequency other than a digital frequency, the first code portion causes the tuner to hunt for a digital frequency over which to receive a code version table containing information regarding the frequency to which to tune to receive the replacement to the second code portion.

17. The control device of claim 16, wherein the tuner hunts for the digital frequency by analyzing each frequency in an available bandwidth.

18. The control device of claim 12, wherein the first code portion runs in a background mode when the second code portion is operating the control device.

19. The control device of claim 12, further comprising a first communication channel and a second communication channel, and wherein the control device communicates with a cable television headend over the first communication channel and the second communication channel.

20. The control device of claim 19, wherein the second communication channel is a bi-directional communication channel.

21. The control device of claim 20, wherein the first code portion runs in a background mode when the second code portion is operating the control device and the first code portion receives a code version table over the second communication channel.

22. The control device of claim 21, wherein the code version table contains information regarding the frequency to which to tune to receive an updated second code portion.

23. A method of operating a settop receiver in a cable television system, the method comprising the steps of:
executing a first code portion, the first code portion residing in a first memory element;
determining whether the first memory element includes a bootable and error-free image of a resident second code portion, wherein the determination is made independent of and prior to executing the second code portion;
displaying a failure indicator if the first code portion is determined to not be operable;
determining whether any key overrides have been input to the settop receiver;
responsive to determining the first memory element includes a bootable and error-free image of the resident second code portion regardless of whether the first code portion is found to contain an error, executing the second code portion;
responsive to determining the first memory element does not include a bootable image of the resident second code portion, or determining that the bootable image of the resident second code portion contains an error, further including the steps of:
receiving a code version table;
parsing the code version table for download information including a frequency identifier and a code identifier;
tuning to a frequency, the frequency given by the frequency identifier, the frequency carrying a digital stream, the digital stream including a replacement second code portion associated with the code identifier;
downloading the replacement second code portion using the code identifier into a second memory element;
determining whether the replacement second code portion is bootable;
responsive to the replacement second code portion being bootable, storing the replacement second code portion in the first memory element; and
responsive to storing the replacement second code portion in the first memory element, executing the replacement second code portion.

24. The method of claim 23, further including the steps of:
receiving a plurality of code version tables, each code version table having Mare information included therein;
determining for each code version table whether the hardware information included therein corresponds to the settop receiver; and
responsive to determining that the hardware information of a given code version table does not correspond to the settop receiver, ignoring the given code version table.

25. The method of claim 23, further including the steps of:
prior to the step of receiving the code version table, determining a specific digital channel to tune to, the digital channel being one of a plurality of digital channels in the cable television system, the specific channel having the code version table carried thereon;
prior to the step of receiving the code version table, tuning to the specific channel, the specific channel carrying a plurality of code version tables therein;
prior to the step of parsing the code version table for download information, parsing a given code version table from the specific channel, wherein the given code version table includes hardware information; and determining whether the hardware information in the given code version table corresponds to the settop receiver.

26. The method of claim 25, wherein the specific accessed channel is the last previously accessed digital channel.

27. The method of claim 23, wherein the step of executing the first code portion further includes the steps of:
  detecting a download code request;
  responsive to detecting the download code request, further including the steps of:
  receiving a second code version table;
    parsing the second code version table for download information including a second frequency identifier and a second code identifier;
    tuning to a second frequency, the second frequency given by the second frequency identifier, the second frequency carrying the digital stream, the digital stream including the replacement second code portion;
    identifying the replacement code portion from the code identifier;
    downloading the replacement second code portion into the second memory element;
    determining whether the downloaded replacement second code portion is bootable; and
    responsive to the downloaded replacement second code portion being bootable, loading the replacement second code portion into the first memory element as the resident second code portion.

28. The method of claim 27, wherein the download code request is a forced download code request, and the replacement second code portion is downloaded and loaded into the first memory element prior to executing the resident second code portion.

29. The method of claim 23, wherein the resident second code portion is executing with the first code portion executing in the background, and further including the steps of:
  receiving a download code request;
  determining whether the download code request is a deferred download code request or a forced download code request;
  responsive to determining the download code request is a forced download code request, further including the steps of:
    downloading the replacement second code portion into the second memory element;
    determining whether the replacement second code portion is bootable; and
    responsive to the downloaded replacement second code portion being bootable, further including the steps of:
      loading the replacement second code portion into the first memory element;
      interrupting the execution of the resident second code portion; and
      executing the replacement second code portion;
  responsive to determining the download code request is a deferred download code request, further including the steps of:
    recording a download frequency;
    waiting for the settop receiver to be initialized;
    responsive to the settop receiver being initialized, further including the steps of:
      tuning to the download frequency, the download frequency carrying the digital stream, the digital stream including the replacement second code portion;
      downloading the replacement second code portion into the second memory element;
      determining whether the downloaded replacement second code portion is bootable; and
      responsive to the downloaded replacement second code portion being bootable, loading the replacement second code portion into the first memory element as the resident second code portion.

30. The method of claim 23, prior to the step of receiving the code version table, further including the steps of:
  (a) tuning to a particular digital channel given in a list of channels;
  (b) synchronizing the settop receiver with the particular digital channel, wherein responsive to the settop receiver being synchronized with the digital channel, the digital channel carrying the code version table therein;
  responsive to the settop receiver not being synchronized with the particular channel, further including the steps of:
    (c) determining from the list of channels a new particular channel to tune to; and
    (d) repeating steps (a), (b), and (c) until all channels in the list of channels have been tuned to;
    (e) responsive to the settop receiver being synchronized to the particular channel, parsing the code version table from the particular channel;
  responsive to all of the channels in the list of channels having been tuned to, further including the steps of:
    (f) tuning to a predetermined frequency carrying a given digital channel;
    (g) synchronizing the settop receiver with the given digital channel;
  responsive to the settop receiver not being synchronized with the given channel, further including the steps of:
    (h) determining a new frequency to tune to;
    (i) repeating steps (f), (g), and (h) until the settop receiver is synchronized with the given channel; and
    (j) responsive to the settop receiver being synchronized with the given channel, parsing the code version table from the given channel.

* * * * *